(12) United States Patent
Chang et al.

(10) Patent No.: US 6,961,105 B2
(45) Date of Patent: Nov. 1, 2005

(54) DUAL-DISPLAY MODULE WITH A TUNABLE MIRROR SHEET

(75) Inventors: Jing-Yi Chang, Taipei (TW); Li-Sen Chuang, Penghu Hsien (TW); Dai-Liang Ting, Hsinchu (TW); Chi-Jain Wen, Hsinchu (TW)

(73) Assignee: Toppoly Optoelectronics Corp., Chunan (TW)

( * ) Notice: Subject to any disclaimer, the term of this patent is extended or adjusted under 35 U.S.C. 154(b) by 49 days.

(21) Appl. No.: 10/793,714

(22) Filed: Mar. 5, 2004

(65) Prior Publication Data

US 2005/0195344 A1 Sep. 8, 2005

(51) Int. Cl.⁷ .................. G02F 1/1335; G02F 1/1347
(52) U.S. Cl. .............................. 349/114; 349/83
(58) Field of Search .................. 349/114, 83, 65, 349/113

(56) References Cited

U.S. PATENT DOCUMENTS

| 6,437,900 | B1 | 8/2002 | Cornelissen et al. |
| 6,831,711 | B2 * | 12/2004 | Choi et al. .................. 349/74 |
| 6,847,427 | B2 * | 1/2005 | Yamauchi .................. 349/113 |
| 2004/0017529 | A1 * | 1/2004 | Choi et al. .................. 349/114 |

* cited by examiner

*Primary Examiner*—James A. Dudek
(74) *Attorney, Agent, or Firm*—Liu & Liu

(57) ABSTRACT

A dual-display module has a first display, a second display opposing the first display, and a backlight module disposed between the first display and the second display. The backlight module has at least one tunable mirror sheet, whereby one side display can be on a mirror-like state at the same time when the other side display is in an active operation state.

18 Claims, 5 Drawing Sheets

DUAL-DISPLAY MODULE WITH A TUNABLE MIRROR SHEET

BACKGROUND OF THE INVENTION

1. Field of the Invention

The invention relates to a dual-display, and more particularly to a dual-display module with a tunable mirror sheet providing improved brightness and eliminating chromatic deviation.

2. Description of the Related Art

The display characteristics of high definition, multicolor displays, include low power consumption, lower voltage requirements and light weight make liquid crystal displays (LCDs) a leading display device technology. LCDs, for example, have been used for several years as displays in, personal digital assistants (PDAs), portable computers, mobile phones, and the like.

Recently, a folding type mobile phone, taking advantage of the advances in fabrication techniques and the desire to display data on front and rear surfaces of the folding portion (or upper housing) thereof, has been developed. A conventional folding type mobile phone utilizes two individual LCDs whose rear surfaces are in contact with each other to achieve a dual-display.

However, since the conventional display device uses two individual displays, two sets of backlight module for providing light passing through the LCDs are required. Accordingly, the display device increases in size and weight and the fabrication cost also increases.

SUMMARY OF THE INVENTION

The present invention is directed to a dual-display module having a single backlight module. The dual-display module has a first display, a second display opposing the first display, and a backlight module disposed between the first display and the second display. The backlight module includes a light-guide plate and a light source. In one aspect of the present invention, the backlight module has at least one tunable mirror sheet selectively reflecting light from the light source or allowing the light to pass through.

In some embodiments, the tunable mirror sheet is disposed between the light-guide plate and the first display. The tunable mirror sheet is a transparent sheet when the first display is turned on for image display, and the tunable mirror sheet is a reflector when the second display is turned on for image display.

In some embodiments, the tunable mirror sheet is disposed between the light-guide plate and the second display. The tunable mirror sheet is a reflector when the first display is turned on for image display, and the tunable mirror sheet is a transparent sheet when the second display is turned on for image display.

In some embodiments, the backlight module includes a first tunable mirror sheet disposed between the light-guide plate and the first display, and a second tunable mirror sheet disposed between the light-guide plate and the second display.

In certain embodiments, the tunable mirror sheet includes a liquid crystal cell without a pixel electrode array. In certain embodiments, the tunable mirror sheet includes an electrically switchable mirror.

DESCRIPTION OF THE DRAWINGS

The present invention will become more fully understood from the detailed description given herein below and the accompanying drawings, given by way of illustration only and thus not intended to be limitative of the present invention.

DETAILED DESCRIPTION OF THE INVENTION

Figure 1:
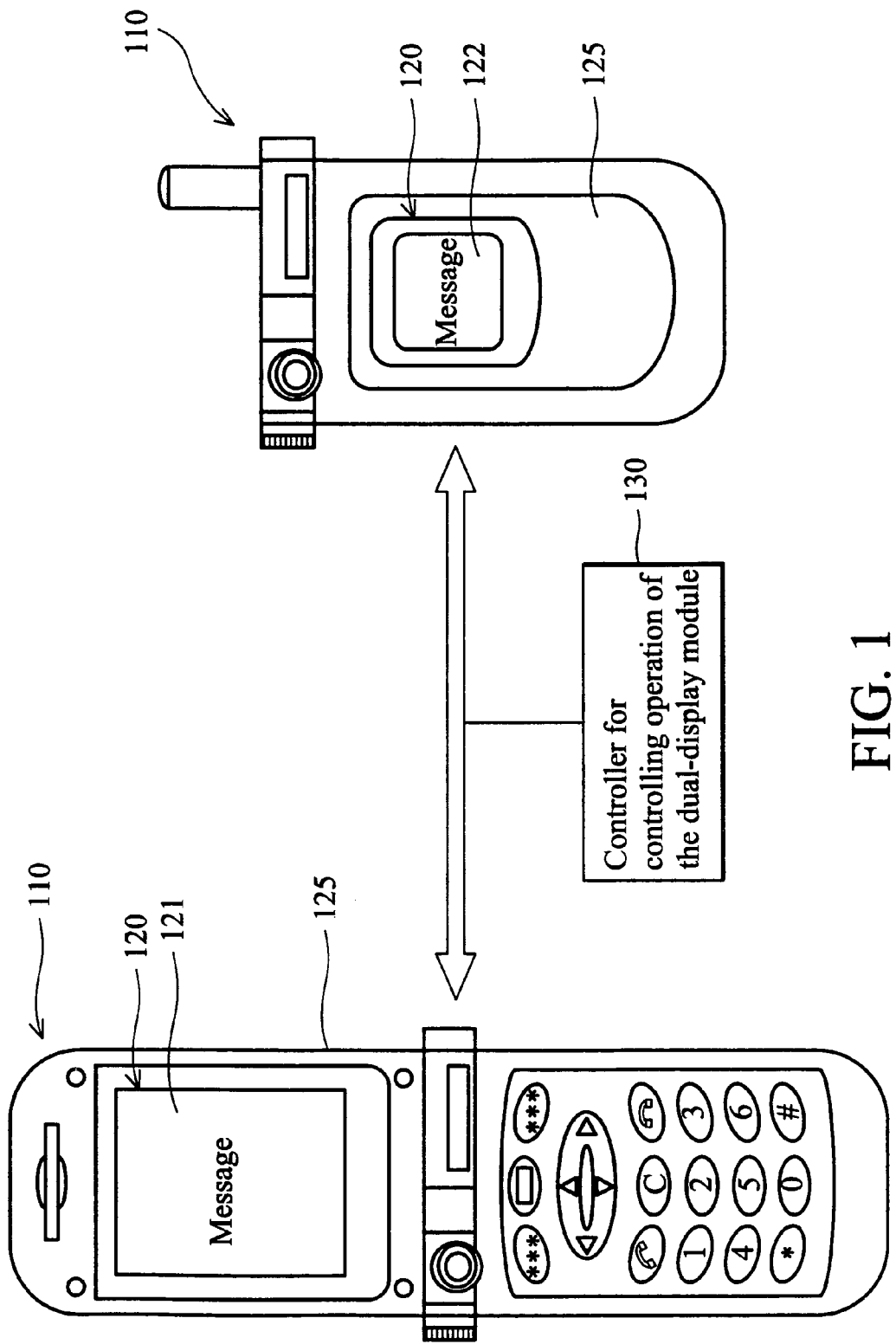
FIG. 1 is a schematic diagram of an electronic device incorporating a dual-display module in accordance with one embodiment of the present invention.

FIG. 1 is a schematic diagram of an electronic device 110 incorporating a dual-display module 120 in accordance with one embodiment of the present invention. The electronic device 110 can be a mobile phone, a hand-held computer and others. A representative folding type mobile phone is shown in FIG. 1. Even so, the teachings may be further applied to any form of display device with the dual-display module. The electronic device 110 includes a dual-display module 120, a controller 130 for controlling operation of the dual-display module 120 and other components, such as keypad. Symbol 121 denotes the main display region, symbol 122 the auxiliary display region and symbol 125 the outer housing. According to signals (or data) from the controller 130, the message of the auxiliary display region 122 is displayed when the housing 125 is shut. Contrarily, the message of the main display region 121 is displayed when the housing 125 is open. That is, the controller 130 is used to control the tunable mirror sheets (50, 54, 62 and 72, shown in FIGS. 2A, 3 and 4) to either reflect light or allow light to pass through.

First Embodiment

Figure 2A:
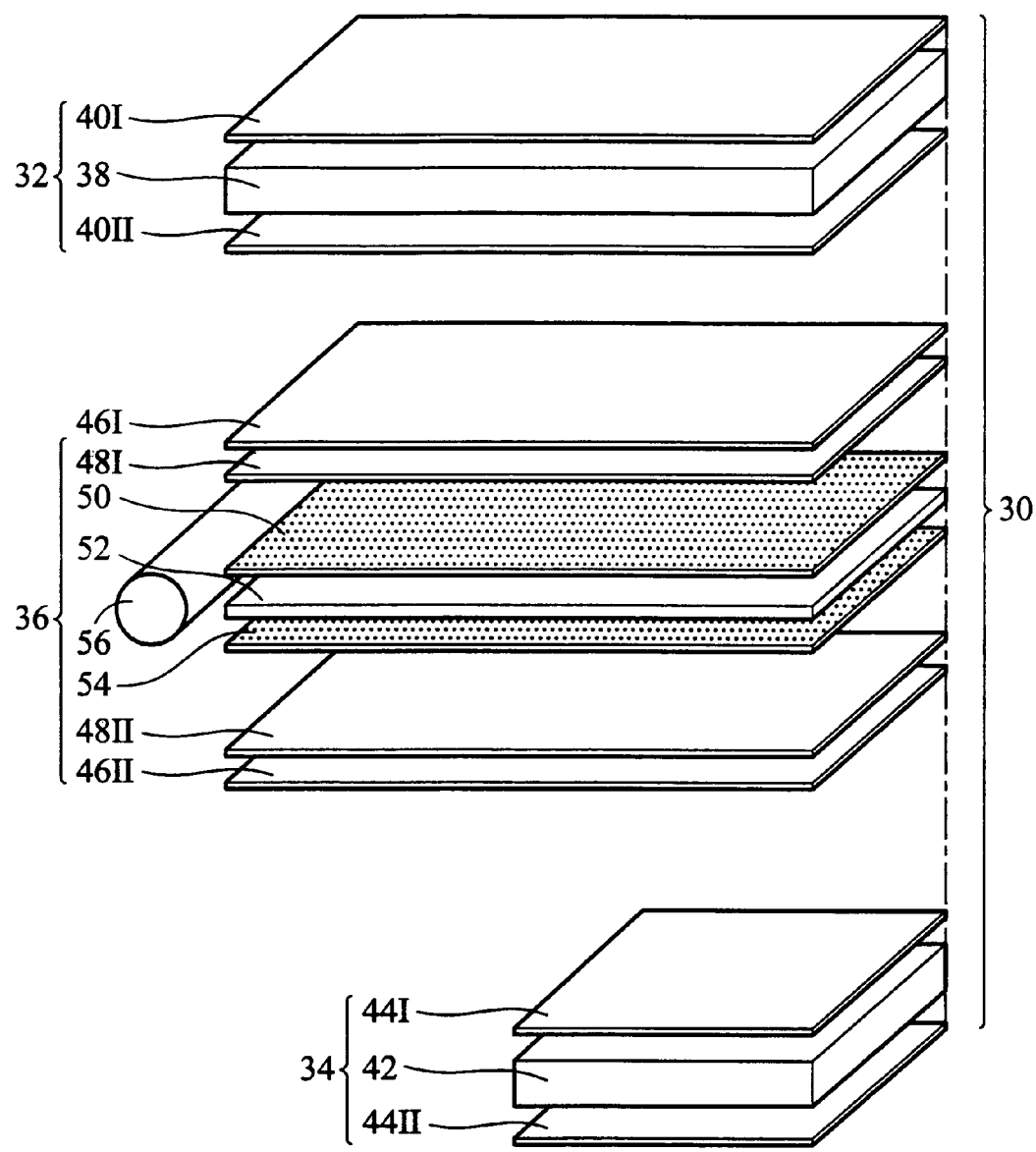
FIG. 2A is an exploded diagram of a dual-display module according to the first embodiment of the present invention.

FIG. 2A is an exploded diagram of a dual-display module according to the first embodiment of the present invention, in which a first display module has a larger display area and a second-display module has a smaller display area. A dual-display module 30 is composed of a first display module 32, a second display module 34, and a backlight module 36 shared therebetween. The first display module 32 providing obverse-side image display comprises a first panel 38, an upper polarizer 40I, and a lower polarizer 40II. The second display module 34 providing reverse-side image display comprises a second panel 42, an upper polarizer 44I, and a lower polarizer 44II. The backlight module 36 includes a light source 56 for the first display module 32 and the second display module 34, and multilayered optical films to improve light intensity and uniformity. The multi-layered optical films include an upper prism sheet 46I, an upper diffusion sheet 48I, a first tunable mirror sheet 50, a light-guide plate (LGP) 52, a second tunable mirror sheet 54, a lower diffusion sheet 48II, and a lower prism sheet 46II. The upper prism sheet 46I, the upper diffusion sheet 48I, and the first tunable mirror sheet 50 are disposed between the first display module 32 and the light-guide plate 52. The second tunable mirror sheet 54, the lower diffusion sheet 48II, and the lower prism sheet 46II are disposed between the second display module 34 and the light-guide plate 52. The light-guide plate 52 is interposed between the first tunable mirror sheet 50 and the second tunable mirror sheet 54.

The first panel 38 may be an LCD panel, and the second panel 42 may be an LCD panel. Also, the area, corresponding location and functions of the first panel 38 and the second panel 42 are not limited in the present invention. The light-guide plate 52 transforms incident light into plane light. Each of the prism sheets 46I and 46II acts as brightness enhanced film (BEF) to transform scattered light passed through the diffusion sheet 48I or 48II into a vertical-form light, achieving a light-collection effect.

Figure 2B:
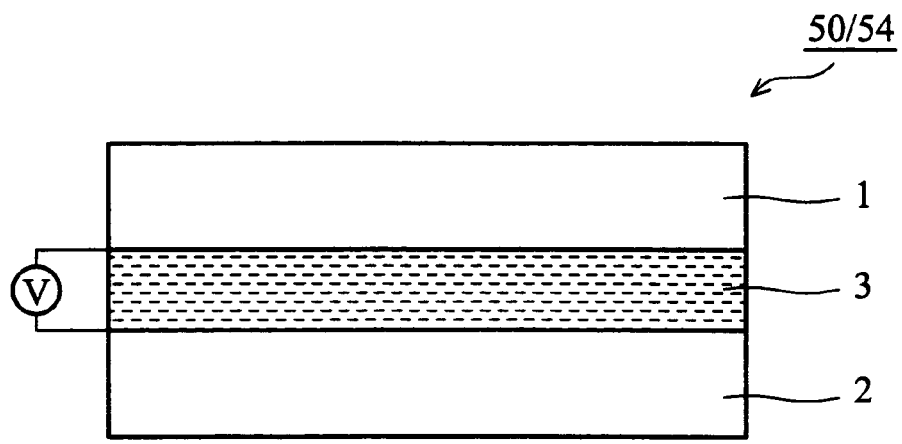
FIG. 2B is an exploded diagram of an LC cell that can be adopted as a tunable mirror sheet in accordance with one embodiment of the present invention.
Figure 2C:
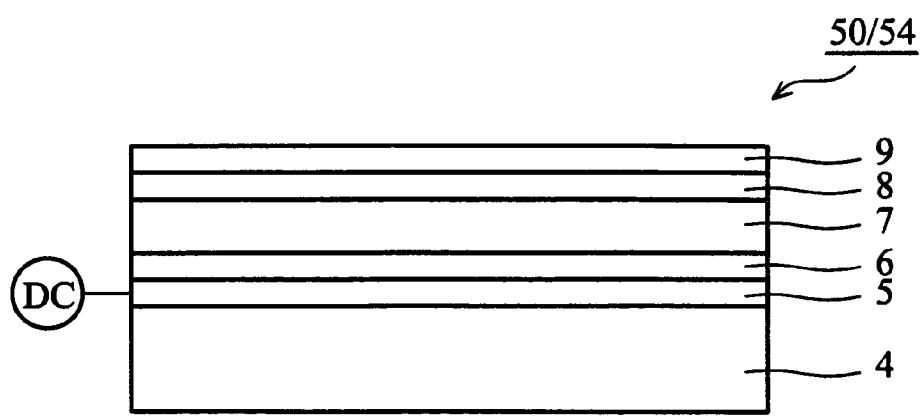
FIG. 2C is an exploded diagram of an electrically switchable mirror that can be adopted as a tunable mirror sheet in accordance with another embodiment of the present invention.

Each of the first tunable mirror sheet 50 and the second tunable mirror sheet 54 can be a liquid crystal (LC) cell without a pixel electrode array or can be an electrically switchable mirror. FIG. 2B is an exploded diagram of an LC cell composed of a pair of glass substrates 1 and 2, and a liquid crystal layer 3 disposed therebetween, wherein the liquid crystal layer 3 includes a cholesteric liquid crystal. An example of an electrically switchable mirror may be referenced in U.S. Pat. No. 6,437,900, which is fully incorporated by reference herein as if fully set forth herein.) FIG. 2C is an exploded diagram of an embodiment of an electrically switchable mirror composed of a transparent substrate 4, a switching layer 5, a palladium layer 6, a solid-state electrolyte layer 7, a transparent electrode layer 8, and a transparent conductive layer 9. For example, the switching layer 5 is $Gd_{0.4}Mg_{0.6}H_x$ (0.8<x<2.4), the solid-state electrolyte layer 7 is $Ta_2O_5.nH_2O$, the transparent electrode layer 8 is $H_xWO_3$ (0<X<0.5), and the transparent conductive layer 9 is indium tin oxide (ITO). According to the applied-voltage mode, the switching layer 5 is switchable between a mirror reflective state and a transparent state.

The dual-display module 30 has tunable mirror function, and its operation mode is described below. When the first panel 38 is turned on for image display, the first tunable mirror sheet 50 becomes a transparent sheet (that is, turning off the mirror function of the first tunable mirror sheet 50), and the second tunable mirror sheet 54 becomes a reflector of the light-guide plate 52 (that is, turning on the mirror function of the second tunable mirror sheet 54). Thus, by combining a fully-transmission characteristic of the first tunable mirror sheet 50 and a fully-reflection characteristic of the second tunable mirror sheet 54, the brightness of the first panel 38 is substantially increased and without encountering chromatic deviation.

Similarly, when the second panel 42 is turned on for image display, the first tunable mirror sheet 50 becomes a reflector of the light-guide plate 52 (that is, turning on the mirror function of the first tunable mirror sheet 50), and the second tunable mirror sheet 54 becomes a transparent sheet (that is, turning off the mirror function of the second tunable mirror sheet 54). Thus, by combining a fully-reflection characteristic of the first tunable mirror sheet 50 and a fully-transmission characteristic of the second tunable mirror sheet 54, the brightness of the second panel 42 is substantially increased and without encountering chromatic deviation.

Operational conditions of the tunable mirror sheets 50 and 54 are provided, but are not intended to limit the present invention. The tunable mirror sheet of FIG. 2B is under a transmission mode when no voltage is applied on the LC cell. Nevertheless, the tunable mirror sheet serves as a reflector when a voltage of about 3~5 Volt is applied to the LC cell. The tunable mirror sheet of FIG. 2C becomes a transparent sheet when a cathodic DC current is applied on the switching layer 5. The operational condition of the electrically switchable mirror of FIG. 2C is described in, for example, U.S. Pat. No. 6,437,900 and other references, and is therefore not discussed herein again.

Compared with the conventional dual-display module having two sets of backlight module, the present invention employs a single backlight module 36 comprising the first tunable mirror sheet 50 and the second tunable mirror sheet 54, such that one of the tunable mirror sheets can act in a mirror-like state at the same time when the other tunable mirror sheet acts in a transparency state. Also, by combining reflection and transmission of the two tunable mirror sheets 50 and 54, each of the two panels 38 and 42 has greater brightness without encountering chromatic deviation.

Second Embodiment

Figure 3:
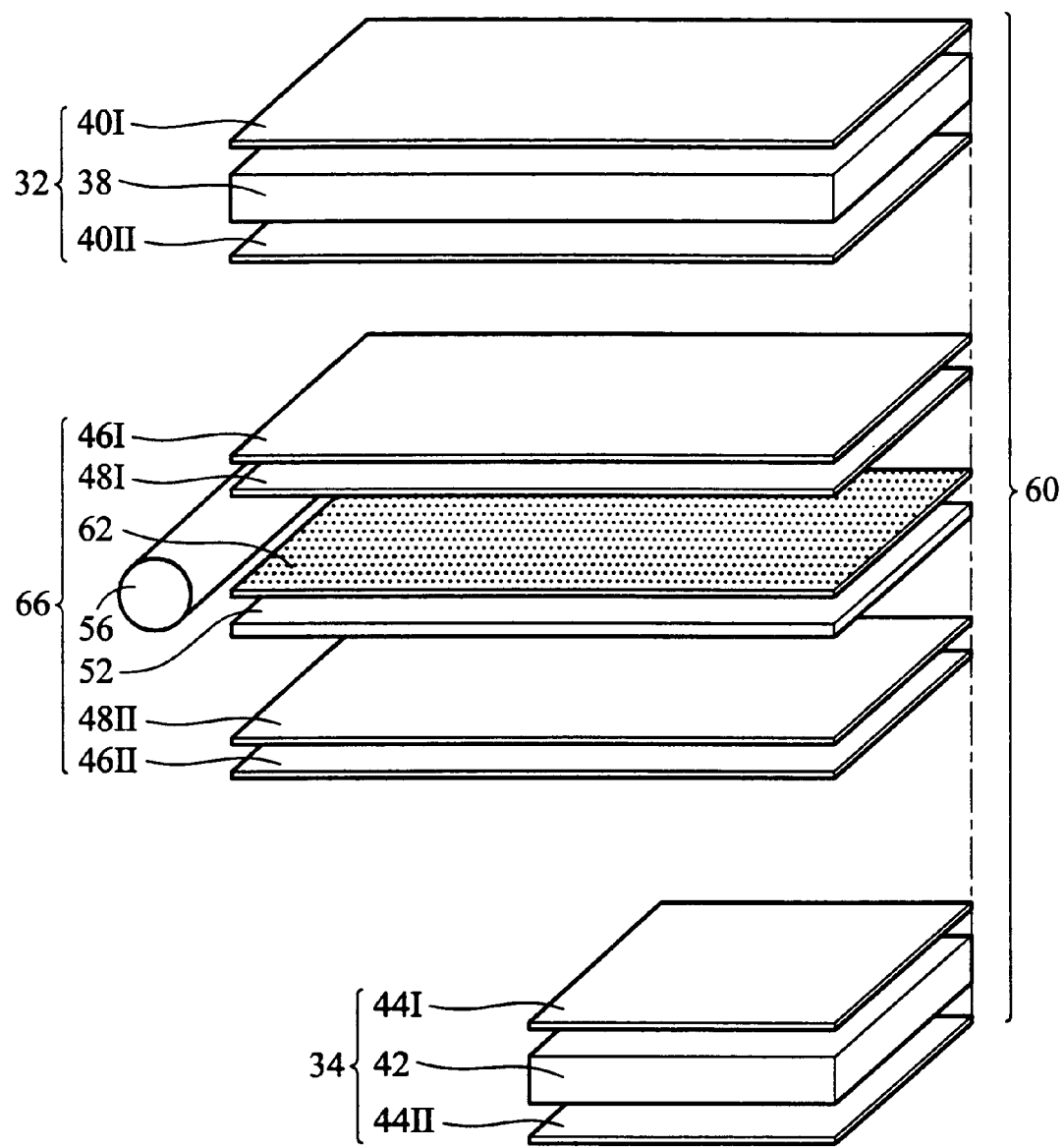
FIG. 3 is an exploded diagram of a dual-display module according to the second embodiment of the present invention.

FIG. 3 is an exploded diagram of a dual-display module according to the second embodiment of the present invention. In this embodiment, a backlight module 66 includes only one tunable mirror sheet 62 adjacent to the first display module 32 and interposed between the upper diffusion sheet 48I and the light-guide plate 52.

The dual-display module 60 has tunable mirror function, and its operation mode is described below. When the first panel 38 is turned on for image display, the tunable mirror sheet 62 becomes a transparent sheet (that is, turning off the mirror function of the tunable mirror sheet 62). When the second panel 42 is turned on for image display, the tunable mirror sheet 62 becomes a reflector of the light-guide plate 52 (that is, turning on the mirror function of the tunable mirror sheet 62).

Third Embodiment

Figure 4:
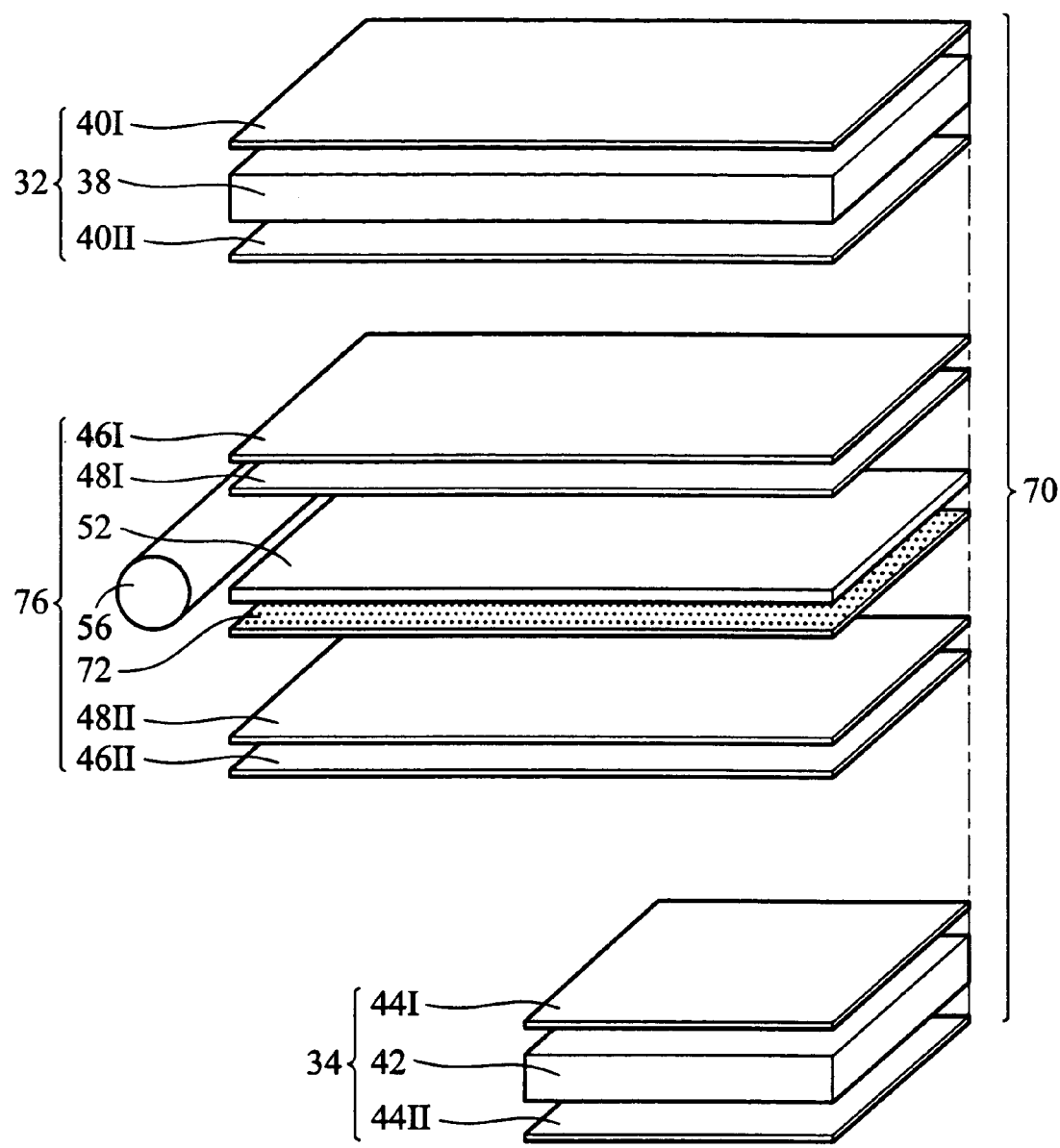
FIG. 4 is an exploded diagram of a dual-display module according to the third embodiment of the present invention.

FIG. 4 is an exploded diagram of a dual-display module according to the third embodiment of the present invention. In this embodiment, a backlight, module 76 includes only one tunable mirror sheet 72 adjacent to the second display module 34 and interposed between the light-guide plate 52 and the lower diffusion sheet 48II.

The dual-display module 70 has tunable mirror function, and its operation mode is described below. When the first panel 38 is turned on for image display, the tunable mirror sheet 72 becomes a reflector of the light-guide plate 52 (that is, turning on the mirror function of the tunable mirror sheet 72). When the second panel 42 is turned on for image display, the tunable mirror sheet 72 becomes a transparent sheet (that is, turning off the mirror function of the tunable mirror sheet 72).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual-display module comprising:
   a first display;
   a second display;
   a light source; and
   at least one tunable mirror sheet disposed between the first display and the second display, the tunable mirror sheet selectively reflecting light from the light source or allowing the light to pass through.

2. The dual-display module of claim 1, further comprising a light-guide plate coupled to the light source and being disposed between the first and second displays, wherein the tunable mirror sheet being disposed between the light-guide plate and either the first or second displays.

3. The dual-display module of claim 1, wherein the tunable mirror sheet includes a pair of substrates and a liquid crystal layer disposed therebetween.

4. The dual-display module of claim 1, wherein the tunable mirror sheet includes a substrate, a switching layer, a palladium layer, a solid-state electrolyte layer and a transparent electrode layer.

5. The dual-display module of claim 1, further comprising:
   a light-guide plate coupled to the light source and disposed between the first and second displays;
   a first tunable mirror disposed between the first display and the light-guide plate; and
   a second tunable mirror disposed between the second display and the light-guide plate.

6. The dual-display module as claimed in claim 5, further comprising:
   a first optical-film structure comprising at least a first prism sheet and a first diffusion sheet and disposed between the light-guide plate and the first display; and
   a second optical-film structure comprising at least a second prism sheet and a second diffusion sheet and disposed between the light-guide plate and the second display.

7. The dual-display module as claimed in claim 5, wherein:
   when the first display is turned on for image display, the first tunable mirror sheet acts a transparent sheet and the second tunable mirror sheet is a reflector; and
   when the second display is turned on for image display, the first tunable mirror sheet acts a reflector and the second tunable mirror sheet is a transparent sheet.

8. The dual-display panel module as claimed in claim 1, wherein the first display is a liquid crystal display.

9. The dual-display panel module as claimed in claim 1, wherein the second display is a liquid crystal display.

10. An electronic device, comprising:
    a dual-display module comprising:
       a first display;
       a second display;
       a light source; and
       at least one tunable mirror sheet disposed between the first display and the second display, the tunable mirror sheet selectively reflecting light from the light source or allowing the light to pass through; and
    a controller for controlling the tunable mirror sheet to either reflect the light or allow the light to pass through.

11. The electronic device of claim 10, further comprising a light-guide plate coupled to the light source and being disposed between the first and second displays, wherein the tunable mirror sheet being disposed between the light-guide plate and either the first or second displays.

12. The electronic device of claim 10, wherein the tunable mirror sheet includes a pair of substrates and a liquid crystal layer disposed therebetween.

13. The electronic device of claim 10, wherein the tunable mirror sheet includes a substrate, a switching layer, a palladium layer, a solid-state electrolyte layer and a transparent electrode layer.

14. The electronic device of claim 10, further comprising:
    a light-guide plate coupled to the light source and disposed between the first and second displays;
    a first tunable mirror disposed between the first display and the light-guide plate; and
    a second tunable mirror disposed between the second display and the light-guide plate.

15. The electronic device as claimed in claim 14, further comprising:
    a first optical-film structure comprising at least a first prism sheet and a first diffusion sheet and disposed between the light-guide plate and the first display; and
    a second optical-film structure comprising at least a second prism sheet and a second diffusion sheet and disposed between the light-guide plate and the second display.

16. The electronic device as claimed in claim 14, wherein:
    when the first display is turned on for image display, the first tunable mirror sheet acts a transparent sheet and the second tunable mirror sheet is a reflector; and
    when the second display is turned on for image display, the first tunable mirror sheet acts a reflector and the second tunable mirror sheet is a transparent sheet.

17. The electronic device as claimed in claim 10, wherein the first display is a liquid crystal display.

18. The electronic device as claimed in claim 10, wherein the second display is a liquid crystal display.

* * * * *